United States Patent [19]

Tsukada et al.

[11] Patent Number: 4,784,469
[45] Date of Patent: Nov. 15, 1988

[54] BEAM SPLITTER FOR COLOR IMAGING EQUIPMENT

[75] Inventors: Tatsuki Tsukada, Yokohama; Hiroshi Nakamura, Kawasaki; Kazuto Tanaka, Omiya, all of Japan

[73] Assignees: Matsushita Electric Industrial Co., Ltd., Osaka; Fuji Photo Optical Co., Ltd., Saitama, both of Japan

[21] Appl. No.: 97,185

[22] Filed: Sep. 16, 1987

[30] Foreign Application Priority Data

Sep. 17, 1986 [JP] Japan .................. 61-218469

[51] Int. Cl.⁴ .................. G02B 7/18; G02B 27/14
[52] U.S. Cl. .................. 350/287; 350/173
[58] Field of Search ............ 350/173, 286, 287, 245, 350/252, 253; 356/345; 33/DIG. 19

[56] References Cited

U.S. PATENT DOCUMENTS 4,084,180 4/1978 Stoffels et al. ............ 350/173

Primary Examiner—John K. Corbin
Assistant Examiner—Ronald M. Kachmarik
Attorney, Agent, or Firm—Birch, Stewart, Kolasch & Birch

[57] ABSTRACT

A beam splitter of a color imaging equipment includes three prism blocks for red, green and blue channels, connecting members for connecting the red channel prism block and the blue channel prism block via an air-gap, and supporting plates for supporting these prism blocks. The connecting members have the same or smaller expansion coefficient as the prism blocks. The supporting plates are connected to the green channel prism block, and substantially not connected to the red and blue channel prism blocks and the connecting members. Consequently, the air-gap between the red and blue channel prism blocks are not affected by the expansion/shrinkage of the supporting plates, and thereby the registration characteristic is improved.

9 Claims, 2 Drawing Sheets

BEAM SPLITTER FOR COLOR IMAGING EQUIPMENT

BACKGROUND OF THE INVENTION

The present invention relates to a beam splitter which is provided in a color imaging equipment and separates incident beams into the three primary colors of red, green and blue.

FIGS. 1 and 2 are composition drawings showing a color imaging equipment with a prior beam splitter. FIG. 1 shows a plan view, and FIG. 2 shows an A—A' sectional side view of FIG. 1. In these figures, a taking lens 1, a beam splitter 2, and a solid-state image sensing device 3R, 3G and 3B are provided The beam splitter 2 provides a blue channel prism block 2B, a red channel prism block 2R, a green channel prism block 2G, and supporting plates 4. An air-gap 6 is formed between the blue channel prism block 2B and the red channel prism block 2R by means of a spacer 5. The red channel prism block 2R and the green channel prism block 2G are connected via a bonding layer 7. The supporting plates 4 are connected via bonding layers 8 to the prism blocks 2R, 2G and 2B, and by means of these supporting plates 4, the prism blocks 2R, 2G and 2B are mounted to a camera chassis (not shown). The solid-state image sensing devices 3R, 3G and 3B are mounted to the beam splitter 2 via spacers 10, respectively, so that they receive outgoing beams from the corresponding prism blocks 2R, 2G and 2B.

Beams received through the taking lens 1 are separated into color beams of red, green and blue by the beam splitter 2, and received by the solid-state image sensing devices 3R, 3G and 3B which are mounted to the respective color channels.

In the meantime, a characteristic which is of most importance in this type of color imaging equipment is a registration characteristic. The registration characteristic represents an amount of image deflection of the red channel Rch from the green channel Gch and of the blue channel Bch from the green channel Gch, with the green channel as the basis, as the number of television lines (TV lines). The registration characteristic required for a color imaging equipment is that the amount of image deflection from the green channel Gch is within 0.2 TV line for both the amount of image deflection Gch-Rch of the red channel Rch and the amount of image deflection Gch-Bch of the blue channel Bch, and these values must be assured within the working temperature range of $-15°$ C. through $60°$ C.

FIG. 3 shows a temperature characteristic of the registration of the color imaging equipment in FIG. 1 and FIG. 2. As illustrated in FIG. 3, the registration of the amount of image deflection Gch-Rch is within 0.2 TV line in the working temperature range, and it satisfies the requirement. However, the registration of the amount of image deflection Gch-Bch exceeds 0.2 TV line, and it does not meet the requirement.

SUMMARY OF THE INVENTION

It is an object, therefore, of the present invention to provide a new beam splitter which can improve the registration characteristic of a color imaging equipment.

The above object is attained by a beam splitter including three prism blocks for red, green and blue channels for separating incident beams into the three primary colors of red, green and blue, and comprising; connecting member means for connecting said red channel prism block and said blue channel prism block, said connecting member means being provided on the surfaces of said red and blue channel prism blocks by striding across a joint portion containing an air-gap between these blocks, and having an expansion coefficient which is identical to or smaller than that of said prism blocks; and supporting plate means which are connected to said green channel prism block and are substantially not connected to said red and blue channel prism blocks and said connecting member means.

BRIEF DESCRIPTION OF THE DRAWINGS

The foregoing object, features and attendant advantages of the present invention will be highly understood as the same become better understood by means of the following description and accompanying drawings wherein.

DETAILED DESCRIPTION OF THE INVENTION

Figure 2:
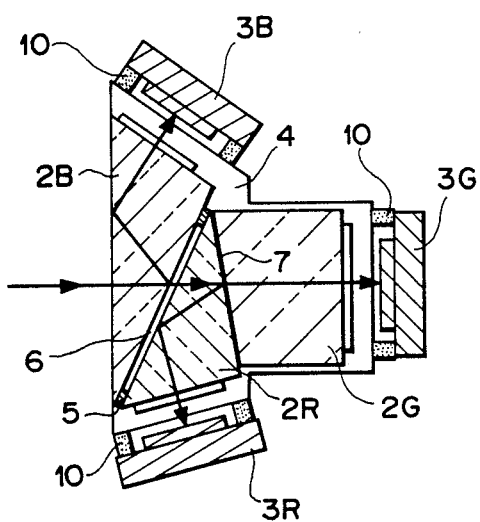
Figure 3:
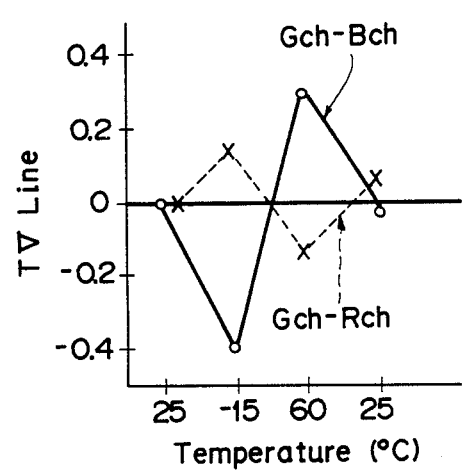
FIG. 3 shows a temperature characteristic of a registration of the color imaging equipment using the prior beam splitter shown in FIGS. 1 and 2, FIGS. 4 and 5 are drawings showing an embodiment of a beam splitter according to the present invention.
Figure 6:
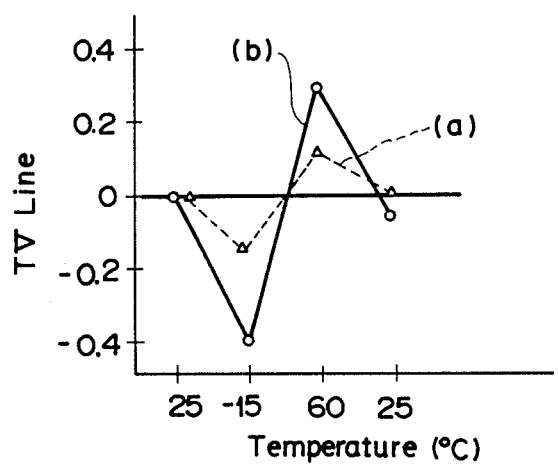
FIG. 6 is a comparison drawing of temperature characteristics of registrations between an experimental beam splitter, and the prior beam splitter.

The inventors of the present invention performed on experiment, assuming that, in the case of the prior beam splitter, the failure of the amount of image deflection Gch-Bch, of the blue channel Bch to the green channel Gch, to satisfy the required value is due to a reason that the air-gap (refrence numeral 6 in FIG. 2) varies by effect of the expansion/shrinkage of the supporting plates (reference numeral 4 in FIGS. 2 and 3), to result in the increase of the registration. A beam splitter was fabricated for the experiment by connecting mutually a red channel prism block and a blue channel prism block to unify three prism blocks and by connecting them to supporting plates by means of an adhesive having flexibility, and the amount of image deflection Gch-Bch of the blue channel Bch to the green channel Gch was measured. Since the red channel prism block and the blue channel prism block are connected mutually, and since each of the prism blocks is connected via the flexible adhesive, the experimental beam splitter is almost not affected by the expansion/shrinkage of the supporting plates at all. FIG. 6 shows the result of the experiment, in which a broken line (a) is a Gch-Bch curve of the experimental beam splitter, and a full line (b) is the Gch-Bch curve of the prior beam splitter which is shown in FIG. 3. As clear from FIG. 6, it is understood that the temperature characteristic of the registration of the experimental beam splitter is improved, and is within 0.2 TV line in the working temperature range, satisfying the required value. And, the variation of the registration of approximately 0.1 TV line is assumed to be the effect due to the expansion/shrinkage of the prism blocks themselves. As clear from the experiment, if a beam splitter is made up so as not to be affected by the expansion/shrinkage of supporting plates, the temperature characteristic of the registration will be greatly improved.

Figure 4:
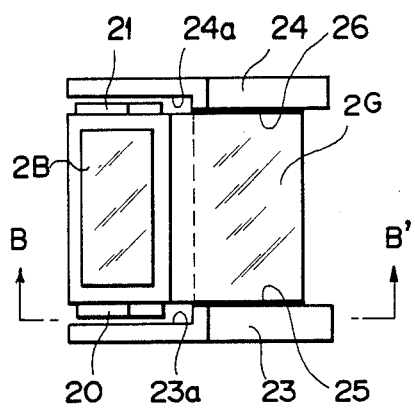
Figure 5:
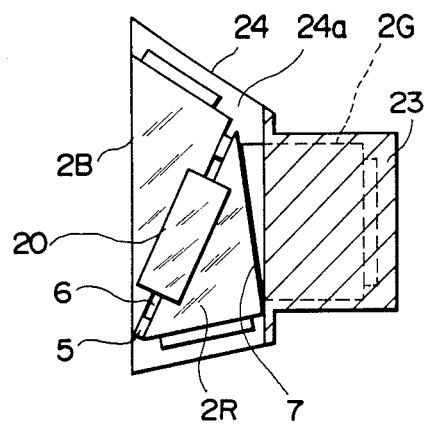

FIGS. 4 and 5 show an embodiment according to the present invention. FIG. 4 is the plan view, and FIG. 5 is the B—B' sectional side view of FIG. 4.

Figure 1:
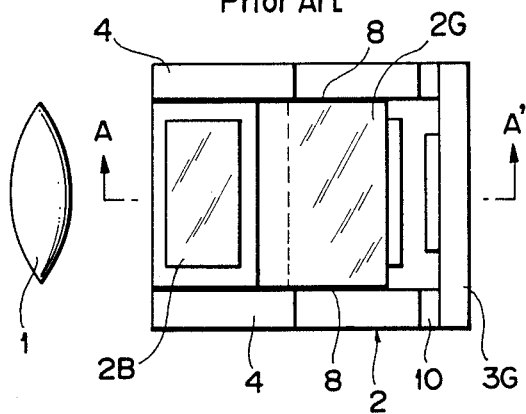
FIGS. 1 and 2 are comparison drawings showing a color imaging equipment with a prior beam splitter.

In these figures, connecting members 20 and 21 are provided for connecting the red channel prism block 2R and the blue channel prism block 2B. The connecting members 20 and 21 are rectangular plates made of the same material as the prism blocks 2R, 2G and 2B. The connecting members 20 and 21 stride across the air-gap 6 between the red channel prism block 2R and the blue channel prism block 2B and are fixed on the surfaces of the blocks 2R, 2B. The connecting members 20 and 21 are provided on both sides of the prism blocks so that they are nearly oppose to each other via the air-gap 6, and thereby the prism blocks 2R and 2B are unified via the air-gap 6. The red channel prism block 2R, as aforementioned in FIGS. 1 and 2, is connected to the green channel prism block 2G via the bonding layer 7. Reference numerals 23 and 24 are supporting plates made of titanium, for example, and are provided on both sides of the prism blocks 2R, 2G and 2B. The supporting plates 23 and 24 have detached portions 23a and 24a which are cut away in approximately an "L" shape at the positions opposing to the side faces of the red channel prism block 2R and the blue channel prism block 2B. The detached portions 23a and 24a of the supporting plates 23 and 24 oppose to the sides of the prism blocks (2R, 2B) and the surfaces of the connecting members (20, 21) via air-layers. The supporting plates 23 and 24 are connected via bonding layers 25 and 26 to the sides of the green channel prism block 2G. For other components, the composition is the same as that of FIGS. 1 and 2.

By the composition as mentioned above, the red channel prism block 2R and the blue channel prism block 2B are unified by the connecting members 20 and 21 which are made of the same material as the prism blocks and at the same time, gaps between the supporting plates 23 and 24 and the prism blocks 2R and 2B with the connecting members 20 and 21 are left unconnected, therefore, the air-gap 6 is not affected by the expansion/shrinkage of the supporting plates 23 and 24, even if it occurrs by variations in ambient temperature. Since the air-gap 6 is only subjected to variations due to the expansion/shrinkage of the prism blocks 2R and 2B, the beam splitter 2 of the present embodiment gives the same effect as that of the aforementioned experimental beam splitter.

In the above embodiment, although the connecting members 20 and 21 are made of the same optical glass as the prism blocks 2R, 2G and 2B, it does not mean that the connecting members are limited to the above-mentioned optical glass. The connecting members 20 and 21 can be made of other materials such as ceramics which have nearly the same expansion coefficient as the prism blocks 2R, 2G and 2B. Also the connecting members 20 and 21 can be made of materials with smaller expansion coefficient than that of the prism blocks 2R, 2G and 2B ($8 \times 10^{-6}/°$ C.), such as quartz ($0.4 \times 10^{-6}/°$ C.) and Invar ® ($0.8 \times 10^{-6}/°$ C.). By making the expansion coefficient of the connecting members 20 and 21 smaller than that of the prism blocks 2R, 2G and 2B, the connecting members 20 and 21 function to suppress the expansion/shrinkage of the prism blocks near the air-gap 6, resulting in further improvement of the registration characteristic.

In the above-mentioned embodiment, gaps between the red and blue channel prism blocks (2R, 2B) with connecting members (20 and 21) and the supporting plates (23, 24) are the air-layer. From the standpoint of a dust prevention, the air-layer can be filled up with a filler material of highly flexible resins such as silicon rubber, which do not provide connecting effect almost at all. By this, the air-gap 6 can be prevented from an invasion of dust, in case that the sides of air-gap 6 is opened. Although the above-mentioned embodiment provides the connecting members 20 and 21 as part of the joint portion containing the air-gap 6 between the red and blue channel prism blocks 2R and 2B, a connecting member can also be provided so that it covers the whole periphery of the joint portion.

As described in detail, according to the present invention, the red channel prism block and the blue channel prism block are connected by the connecting members which have the same or smaller expansion coefficient than that of the prism blocks, and the supporting plates and the red and blue channel prism blocks with the connecting members are so composed that they are substantially not connected, therefore, the air-gap between the red channel prism block and the blue channel prism block is not affected by the expansion/shrinkage of the supporting plates. Consequently, when the connecting members provide the same expansion coefficient as that of the prism blocks, the air-gap varies according to the expansion/shrinkage of the prism blocks themselves, and when the expansion coefficient of the connecting members is smaller than that of the prism blocks, the expansion/shrinkage of the prism blocks is suppressed. Therefore, the temperature characteristic of the registration will be improved.

From the foregoing it will now be apparent that a new and improved beam splitter has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A Beam splitter for a color imaging equipment, including red, green and blue channel prism blocks for separating incident beams into three primary colors of red green and blue, and comprising;
    connecting member means for connecting said red channel prism block and said blue channel prism block, said connecting member means being provided on the surfaces of said red and blue channel prism blocks by striding across a joint portion containing an air-gap between said both blocks, and having an expansion coefficient which is identical to or smaller than that of said prism blocks; and
    supporting plate means which are connected to said green channel prism block and are substantially not connected to said red and blue channel prism blocks and said connecting member means.

2. A beam splitter according to claim 1, wherein said connecting member means are made of the same material as said prism blocks.

3. A beam splitter according to claim 1, wherein said connecting member means are made of ceramics of which the expansion coefficient is the same as or smaller than that of said prism blocks.

4. A beam splitter according to claim 1, wherein said connecting member means are made of quartz.

5. A beam splitter according to claim 1, wherein said connecting member means are made of Invar ®.

6. A beam splitter according to claim 1, wherein said connecting member means cover a part or the whole of said joint portion.

7. A beam splitter according to claim 1, wherein said connecting member means are two plate members partially covering said joint portion, and said plate members oppose to each other across said red and blue channel prism blocks.

8. A beam splitter according to claim 1, wherein said supporting plate means oppose, via air-layers, to said red and blue channel prism blocks and said connecting member means.

9. A beam splitter according to claim 1, wherein said supporting plate means oppose to said red and blue channel prism blocks and said connecting member means via a filler material with high flexibility and almost without connecting effect.

* * * * *